Sept. 28, 1971
TAKASHI SEGAWA ET AL 3,608,398
BICYCLE HUB HAVING A BUILT-IN THREE-STAGE SPEED CHANGE MECHANISM
Filed Sept. 15, 1969
5 Sheets-Sheet 1
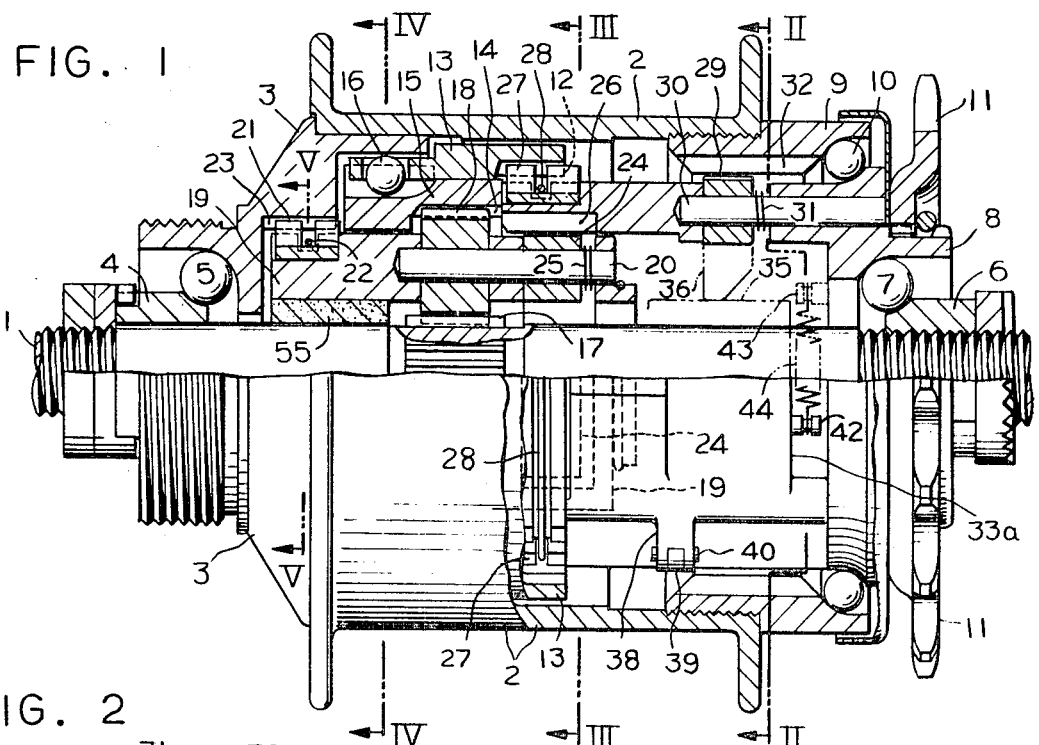
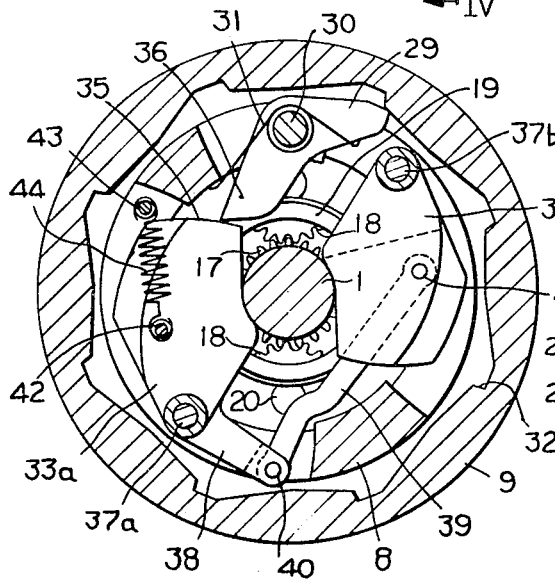
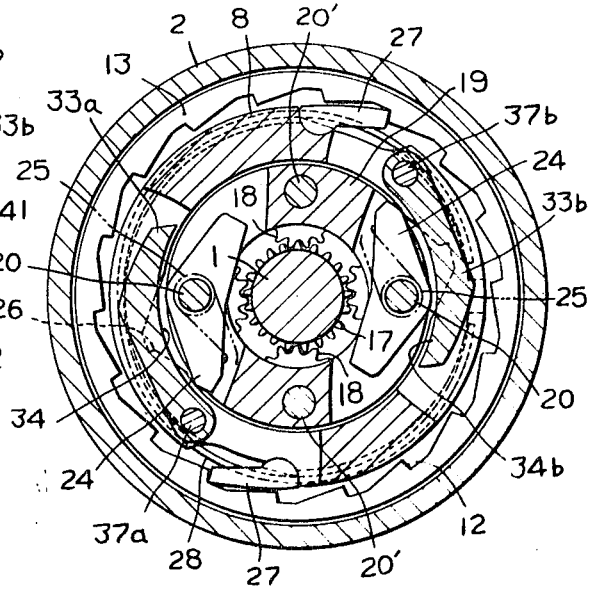
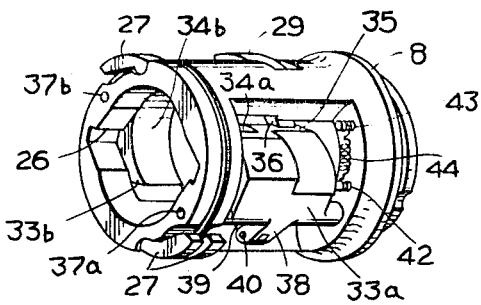
TAKASHI SEGAWA and
RYUICHI YAMAMOTO,
Inventors
By Wendroth, Lind & Ponack
Attorneys

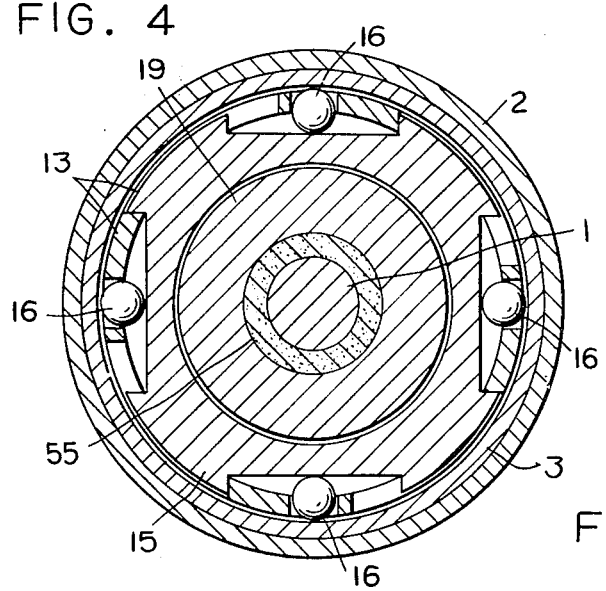

TAKASHI SEGAWA and
RYUICHI YAMAMOTO,
Inventors

By. Wenderoth, Lind & Ponack
Attorneys

TAKASHI SEGAWA and
RYUICHI YAMAMOTO,
Inventors

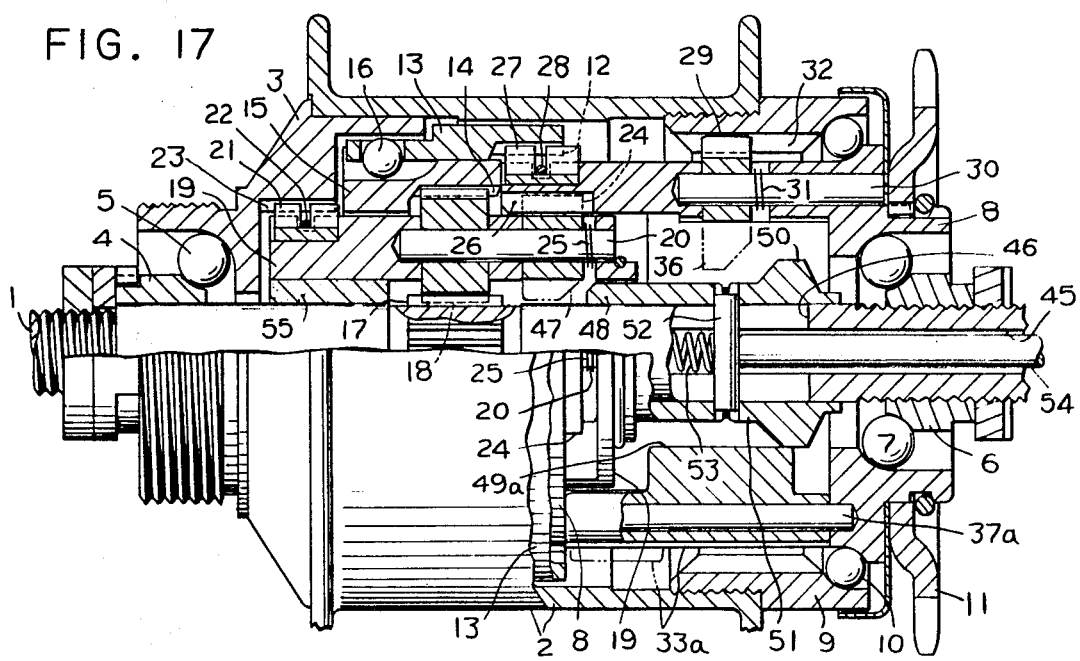
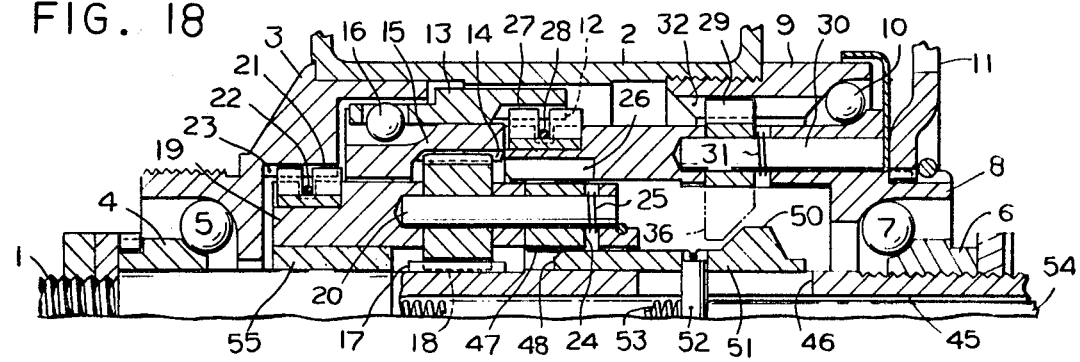
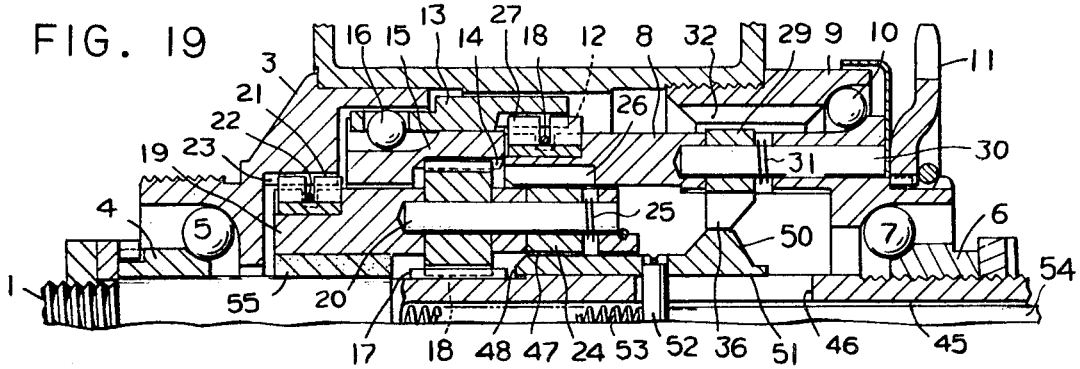

United States Patent Office 3,608,398
Patented Sept. 28, 1971

3,608,398
BICYCLE HUB HAVING A BUILT-IN THREE-STAGE SPEED CHANGE MECHANISM
Takashi Segawa and Ryuichi Yamamoto, Osaka, Japan, assignors to Shimano Kogyo Kabushiki Kaisha, Sakai, Osaka, Japan
Filed Sept. 15, 1969, Ser. No. 857,745
Claims priority, application Japan, Sept. 24, 1968, 43/68,218; Sept. 27, 1968, 43/70,556
Int. Cl. F16h 5/42
U.S. Cl. 74—752          3 Claims

ABSTRACT OF THE DISCLOSURE

A bicycle hub having a built-in three-stage speed change mechanism in which a high and a normal speed-ratio transmission ratchet gearing are arranged adjacent to each other, and an automatic speed-ratio control means is provided consisting of centrifugal governor weights oscillatable inwardly and outwardly around the axis of said hub in synchronism with each other according to the driving speed of the bicycle, said ratchet gearings being adapted to be automatically put into and out of engagement individually by the common speed-ratio control means upon oscillation thereof thereby effecting automatic three-stage speed change.

---

This invention relates to a bicycle rear hub having an automatic built-in three-stage speed change mechanism, in which an automatic speed-ratio control means consisting of oscillatable centrifugal governor weights is provided to effect an automatic changeover of a power transmission condition of said mechanism.

The conventional bicycle hub of this type has been disadvantageous in that it is complicated in construction and large in size as well as being costly to manufacture. In addition, a further unsatisfactory feature lies in the fact that because the shifts between normal and low speeds and between high and normal speeds are effected by the use of separate automatic speed-ratio control means respectively, each governor weight per se of said control means is inevitably reduced in size and thereby liable to be undesirably effected, with the attendant disadvantage that it becomes difficult to ensure a stable changeover operation.

Accordingly an object of the present invention is to provide an improved bicycle rear hub having an automatic built-in three-stage speed change mechanism which does not possess the unsatisfactory features before referred to, that is to say, to provide a rear wheel hub of the type specified which is simple and compact in construction, reliable and positive in operation and inexpensive to manufacture.

Another object of the invention is to provide a bicycle rear hub of the type specified, the speed change mechanism of which is adapted to be automatically and artificially placed into any speed-ratio transmission condition so that a bicycle driver may effect at will the manual changeover of a power transmission condition according to changes of natural environment, such as, the direction of the wind, road conditions and so on.

Thus, according to the present invention, a bicycle rear hub of the type specified is characterized by the provision of an automatic three-stage speed change mechanism which includes an automatic speed-ratio control means consisting of centrifugal governor weights oscillatable inwardly and outwardly around the axis of said hub responsive to the driving speed of the bicycle, and two ratchet gearings for high speed driving and normal speed driving disposed adjacent to each other, said ratchet gearings being adapted to be put into and out of engagement individually by said common automatic control means, and which is adapted to employ a single planetary gear mechanism thereby increasing the mounting space for said automatic control means, the arrangement being such that each governor weight per se can be increased in size, with the attendant advantage that many practical effects as hereinbefore described can be exhibited.

In one embodiment of the invention, the changeover of a power transmission condition from one gear or speed to another is accomplished automatically by the action of the centrifugal governor weights. In another embodiment, the speed change mechanism further comprises changeover means for artificially changing-over the power transmission condition thereof, which includes a ring bushing slidably mounted on a rear dead axle of the bicycle, and a push rod disposed within said dead axle. By remotely actuating push rod from a suitable exterior control lever, said changeover bushing can be moved so that the high and the normal speed-ratio transmission ratchet gearing are forced into and out of operative engagement individually, attendant the shifting to obtain high, normal or low speed power transmission irrespective of the action of the centrifugal governor weights.

The invention will now be described further, by way of example only, with reference to the accompanying drawings illustrating two embodiments thereof and in which:

FIG. 1 is a rear view in longitudinal section of a three-stage speed change hub constructed according to the present invention, showing various parts in the low speed-ratio transmission condition;

FIGS. 2 to 5 are cross sections taken along lines II—II, III—III, IV—IV and V—V, respectively, of FIG. 1;

FIG. 6 is a perspective view showing only a driving drum;

FIG. 7 is a cross section corresponding to FIG. 2, but showing the various parts in the normal speed-ratio transmission condition;

FIG. 8 is a fragmental cross-sectional view corresponding to FIG. 3, but showing the various parts in the normal speed-ratio transmission condition;

FIG. 9 is a cross-section corresponding to FIG. 2, but showing the various parts in the high speed-ratio transmission condition;

FIG. 17 is a rear view, partly in longitudinal section, similar to FIG. 10, but the various parts being forced into the high speed-ratio transmission condition as a result of actuation from an exterior control means; and FIGS. 18 and 19 are upper half views similar to FIG. 10, but showing the various parts in the normal and the low speed-ratio transmission condition, respectively.

Figure 10:
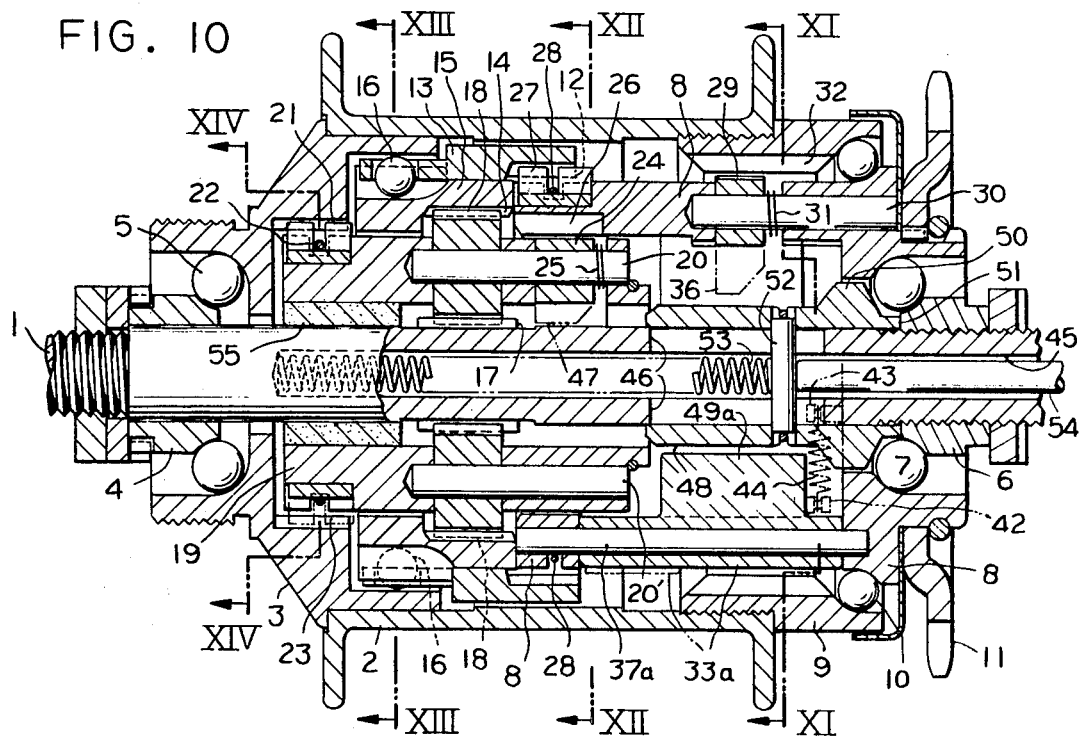
FIG. 10 is a rear view in longitudinal section of a three-stage speed change hub forming another embodiment of this invention, various parts being shown in the low speed-ratio transmission condition.

Referring to the drawings and particularly to FIG. 1 thereof, the reference numeral 1 designates a rear dead axle of a bicycle, which extends through a hub shell 2. A left hand extension 3 of the hub shell 2 is supported on the left hand end of said dead axle 1 by a ball bearing inner race 4 through bearing balls 5. The dead axle 1 has at its right hand end a screw threaded hub cone or ball bearing inner race 6 supporting a driving drum 8 through bearing balls 7. A right hand extension 9 of the hub shell 2 is supported by a radially outwardly protruding flange portion of said driving drum 8 forming an inner face of a ball bearing comprising bearing balls 10. A sprocket wheel 11 is securely mounted on the right hand end of said driving drum 8.

Within the hub shell 2, there are provided a first driven member 13 formed with internal ratchet-like saw teeth 12 and a second driven member 15 with internal gear teeth 14. As shown in FIGS. 1 and 4, the second driven member 15 is formed with a plurality of axially extending slots or channels, into each of which respective leftwardly extending arcuate projections of the first driven member 13 are disposed in a manner allowing these members to be rotated within the limit of a predetermined angle relative to each other. At the said arcuate projections, a plurality of balls 16 are respectively supported by the first driven member 13 in a manner allowing the hub shell 2 to be rotated through said balls 16 upon normal (forward) rotation of the second driven member 15. Thus, it will be understood that the balls 16 act as one-way clutch means.

The rear axle 1 has a fixed sun gear 17 mounted at approximately the mid portion thereof, which meshes with a plurality of planet pinions 18 carried by a planet carrier 19. Each planet pinion is mounted on a pin 20 or 21' so as to mesh with said internal gear teeth 14. On the left hand end portion of the planet carrier 19, there are provided a plurality of low speed driving pawls— in this example two pawls 21 (FIGS. 1 and 5) disposed in diametrically symmetric positions, each normally biassed by a spring 22 to bring the tip thereof into driving engagement with ratchet-like saw teeth 23 formed in the corresponding left hand extension 3 of the hub shell. On the other hand, the rightwardly extending portion of the planet carrier 19 is provided with a plurality of high speed driving pawls 24 (FIGS. 1, 3, 8 and 9) loosely mounted on said associated pins 20, each pawl 24 being normally biassed by a spring 25 to bring the tip thereof into driving engagement with internal ratchet-like saw teeth 26 formed in the left hand extension of the driving drum 8, thus forming a high speed-ratio transmission gearing.

As shown in FIGS. 1, 3, 6 and 8, the driving drum 8 is further provided at the left hand extension with a plurality of low speed drive pawls 27. Like said pawls 21, each of said pawls 27 is normally biassed by a spring 28 to bring the tip thereof into driving engagement with the saw teeth 12. In addition, at approximately the mid portion of the driving drum, there is provided a normal or middle speed driving pawl 29 (FIGS. 1, 2, 6 and 7) loosely mounted on a pin 30, normally biassed by a spring 31 to bring its tip into driving engagement with ratchet-like saw teeth 32 formed in the right hand extension of the hub shell 2 thereby forming a normal speed-ratio transmission ratchet gearing.

As will be seen in FIGS. 1, 2, 3 and 6, with respect to the driving drum 8, two centrifugal governor weights 33a, 33b are oscillatably mounted, respectively, on pins 37a, 37b in diametrically symmetric relation with each other. Abutting inner faces 34a, 34b (facing inwardly of the driving drum 8) of the governor weights 33a, 33b are positioned opposite the respective tips of the high speed driving pawls 24 while an arcuate abutting face 35 formed at the tip of the governor weight 33a is opposed to a tail 36 of the normal speed-ratio transmission pawl 29 as best shown in FIG. 2. In order to eliminate any functional error due to vibration of said centrifugal governor weights 33a, 33b during driving of the bicycle, a link 39 (FIGS. 1 and 2) is connected between a tail 38 of the governor weight 33a and the governor weight 33b by pins 40 and 41 thereby enabling both said governor weights to be simultaneously oscillated inwardly and outwardly around the hub axis. The centrifugal governor weight 33a has a hook 42, and this hook is connected by means of a tension spring 44 with another hook 43 provided on the driving sleeve 8, thereby giving the tips of both centrifugal governor weights 33a and 33b a tendency to be oscillated inwardly relative to the axis of the hub.

By such arrangement, if the speed of rotation of the driving drum 8 remains less than a predetermined speed, the governor weights 33a, 33b will be held in the inwardly oscillated positions by the action of the spring 44 which overcomes the centrifugal forces on said governor weights, so that the abutting face 35 of the governor weight 33a will abut against and suppress the tail 36 of the normal speed driving pawl 29, thereby bringing the tip of the pawl 29 out of operative engagement with the saw teeth 32 as shown in FIG. 2. In this case, the high speed driving pawls 24 are prevented by the inner surfaces 34a, 34b of said governor weights from being engaged with the saw-teeth 26 as shown in FIG. 3. When the rotational speed of the driving drum 8 is increased beyond said predetermined speed, the governor weights 33a and 33b will be oscillated outwardly to a certain extent against the action of the tension spring 44, as shown in FIGS. 7 and 8. Under such oscillated condition, although the high speed driving pawls 24 remain disengaged from the saw teeth 26, the suppressed tail 36 of the normal speed-ratio transmission pawl 29 will be automatically released, whereby the tip thereof will be brought into operative engagement with the saw teeth 32. If the speed of rotation of the driving drum 8 further reaches a predetermined high speed, the centrifugal governor weights 33a, 33b will be further oscillated outwardly and the inner surfaces 34a, 34b thereof are brought outside of the saw teeth 26 as shown in FIG. 9, whereupon the high speed driving pawls 24 will be brought into operative engagement with the saw teeth 26.

As will be apparent from the above description, when the rotational speed of the sprocket wheel 11 is comparatively low, for example at the start of bicycle driving, the rotation of said sprocket wheel 11 is transmitted through the driving drum 8, the low speed driving pawls 27, the saw teeth 12, the first and second driven members 13 and 15, the saw teeth 14, the planet pinions 18, the planet carrier 19, the low speed driving pawls 21, the saw teeth 23 and the left hand extension 3 and thence to the hub shell 2, under the reduced speed-ratio transmission condition, since the normal speed-ratio ratchet gearing and the high speed-ratio transmission ratchet gearing are both held in the inoperative condition. When the speed of rotation of the driving drum 8 is increased, the centrifugal governor weights are oscillated outwardly, whereby operative engagement of the normal speed-ratio transmission ratchet gearing occurs while maintaining the high speed-ratio transmission ratchet gearing in said inoperative condition. In this case, the drive will be through the sprocket wheel 11 to the driving drum 8 and thence to the hub shell 2 through the normal speed driving pawl 29 and the saw teeth 32 under the direct route normal speed-ratio transmission condition. In the normal speed or drive, the low speed driving pawls 21 are erected or radially extended, but it will be noted that the same are not in driving engagement with the saw teeth 23 because of a higher rotational speed of the saw teeth 23 relative to the planet carrier 19. When the speed of rotation of the sprocket wheel 11 is further increased and therefore the centrifugal governor weights are further pivotally moved outwardly, the high speed-ratio transmission ratchet gearing is brought into operative engagement. In this case, the rotation of the sprocket wheel 11 is transmitted through the driving drum 8, the saw teeth 26, the high speed-ratio transmission pawls 24, the planet carrier 19, the planet pinions 18, the gear teeth 14, the first driven member 13, the balls 16, and the left hand extension 3, to the hub shell 2, under the increased high speed-ratio transmission condition. In the above-mentioned high speed-ratio transmission condition, the pawls 21, 27 and 29 are all erected or radially extended, but these pawls are substantially ineffective because of a higher rotational speed of the saw teeth relative to the corresponding pawls.

In addition, as will be seen in FIG. 1, an oilless bearing 55 may be preferably provided between the planet carrier 19 and the rear axle 1, if necessary.

Figure 11:
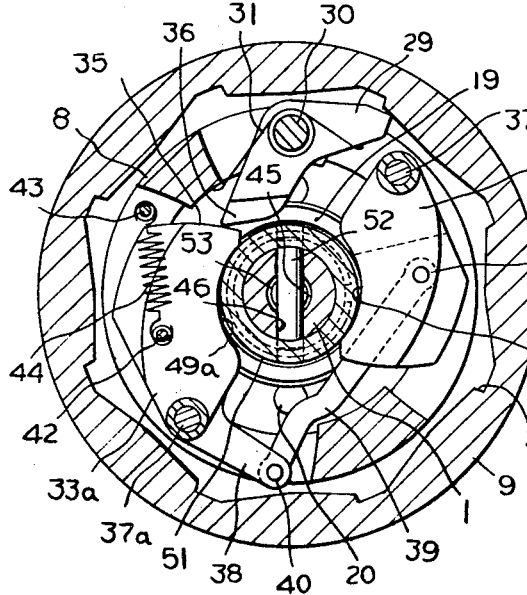
FIGS. 11 to 14 are cross-sectional views taken along lines XI—XI, XII—XII, XIII—XIII and XIV—XIV, respectively, of FIG. 10.
Figure 12:
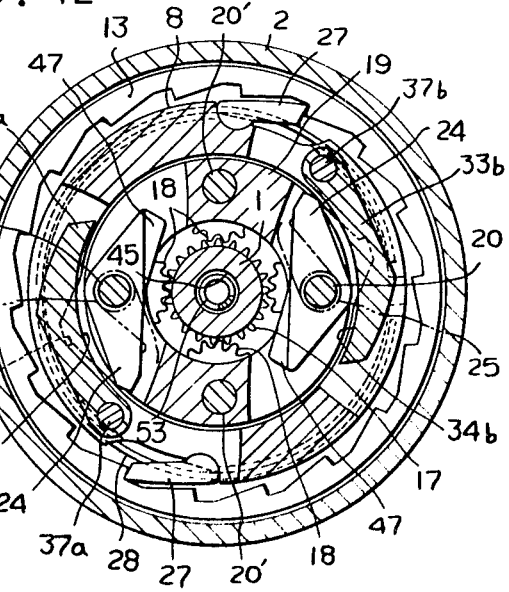
Figure 13:
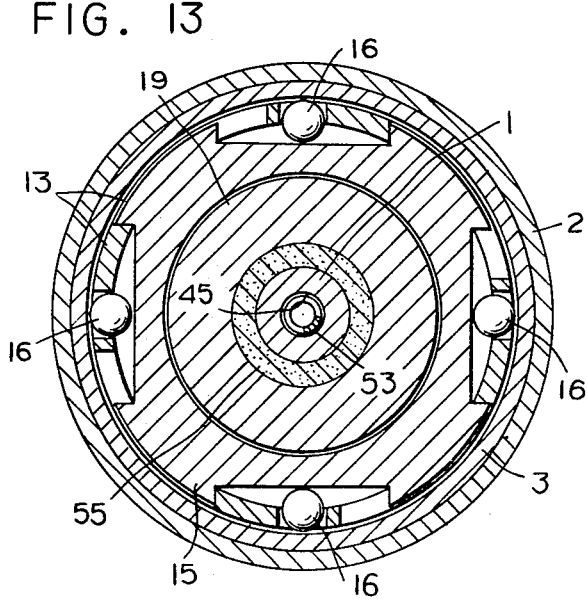
Figure 14:
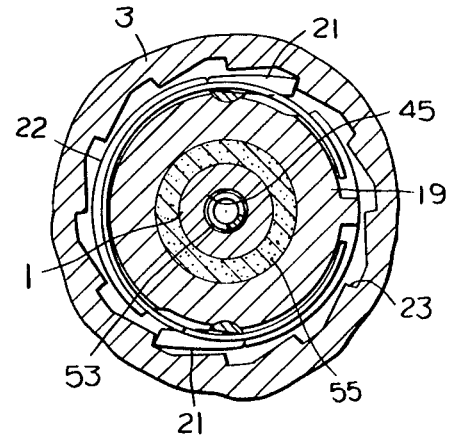
Figure 15:
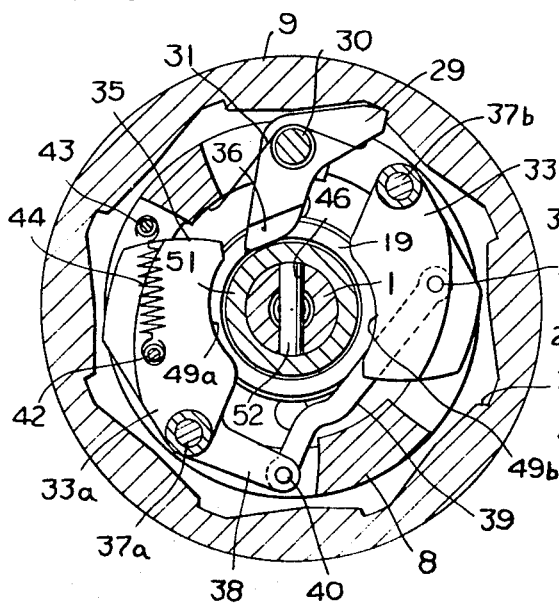
FIG. 15 is a cross-sectional view corresponding to FIG. 7, but showing the various parts in the normal speed-ratio transmission condition.
Figure 16:
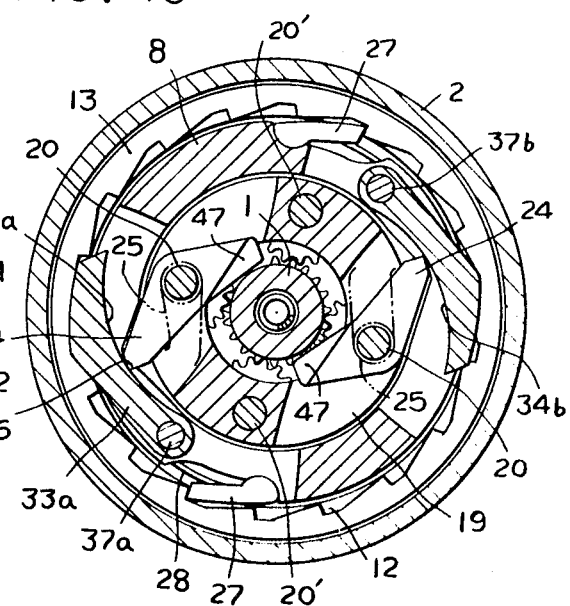
FIG. 16 is a cross-sectional view corresponding to FIG. 9, but showing the various parts in the high speed-ratio transmission condition.

In FIG. 10, there is shown another embodiment of this invention, wherein the shift from one gear or speed to another is adapted to be accomplished both automatically and artificially. For this purpose, the rear dead axle 1 is formed with a rightwardly facing concentric guide bore 45 and a pair of diametrically symmetric guide slots 46 and associated with a manual changeover bushing or ring 51 slidably mounted on the axle 1. This bushing is composed of a leftwardly extending cylinder portion 48 and an enlarged annular flange portion 50, the former being provided at the left hand end with an inclined guide face engageable with tails 47 of the high speed driving pawls 24, and the latter being provided with an inner inclined guide face engageable with driven parts 49a, 49b of the centrifugal governor weights 33a, 33b. A radially extending control pin 52 is inserted into said slots 46 with its opposite ends being engaged with the changeover bushing 51, thereby enabling the changeover bushing 51 to be moved axially inwardly and outwardly along the axle 1 by remotely actuating said control pin 52 in a manner as will be hereinafter described. Within the deep guide bore 45 in the axle 1, there are disposed a spring 53 and a push rod 54 as shown. The inner end of said push rod 54 abuts against the center of the control pin 52 as shown in FIG. 11. It will be seen that said bushing 51 and the control pin 52 are normally biassed outwardly by the spring 53, and that the same can be moved axially leftwardly into desired positions by remotely actuating the push rod 54 against the action of the spring 53 from a suitable exterior control lever of conventional form (not shown).

As will be understood from the foregoing, in case the bushing 51 is held in an outermost position as shown in FIG. 10, the changeover of speed-ratio can be accomplished automatically as in the previous embodiment, because the bushing 51 has no relation with any power transmitting part in said transmission systems. On the contrary, when the push rod 54 is moved axially leftwardly for a predetermined distance as shown in FIG. 17, with attendant similar movement of the bushing 51, the annular flange portion 50 of the bushing has the inclined guide face abut against the driven parts 49a, 49b of the centrifugal governor weights and then actuates the latter, whereupon they are oscillated outwardly and held in the extreme outer position. Under such circumstances, the high speed driving pawls 24 and the normal speed driving pawl 29 are held in engagement with the saw teeth 26 and 32 respectively, so that the mechanism is brought into the high speed-ratio transmission condition. When the changeover bushing 51 is further moved axially leftwardly into a position as shown in FIG. 18 by actuating the push rod 54, the centrifugal governor weights 33a, 33b remain in said extreme outwardly oscillated position, but the high speed driving pawls 24 are disengaged from the saw teeth 26 because the tails 47 thereof are pressed by the cylinder portion 48 of the bushing, attendant the shifting to obtain normal speed power transmission. When the push rod 54 is further forced axially leftwardly to move the changeover bushing 51 into the extreme leftward position as shown in FIG. 19, the high speed driving pawls 24 are still held out of engagement with the saw teeth 26, and the normal speed-ratio transmission pawl 29 is disengaged from the saw teeth 32 because the tail of the pawl 29 is pressed radially outwardly by the annular flange portion 50 of the bushing. In this case, the bicycle is driven under the low speed-ratio transmission condition.

From the foregoing it will be understood that, according to the invention, the high and the normal speed-ratio transmission ratchet gearing are associated with the common automatic speed-ratio control means and the speed change mechanism employs the single planetary gear mechanism, so that the invention has many practical effects, such as, a simple construction, a stable operation and so on as hereinbefore described. It will be further understood, with the bicycle hub having the built-in three-stage speed change mechanism provided with the manual changeover means, that the three-stage speed change, i.e. the increased, the normal and the reduced speed can be manually effected irrespective of the action of the automatic speed-ratio control means, so that the bicycle driver may at will effect changeover to any desired speed-ratio transmission condition according to changes of natural environment, such as, the direction of the wind, road conditions and so on.

While the invention has been described with respect to two preferred specific embodiments, it is to be understood that various changes in the details of construction of parts may be made without departing from the spirit and scope of the invention.

What is claimed is:

1. A rear bicycle hub having a built-in three-stage speed change mechanism, comprising:
  (a) a hub shell,
  (b) a rear dead axle extending through said hub shell,
  (c) a driving drum rotatably mounted on said dead axle,
  (d) a single planetary gear mechanism including a planet carrier rotatably mounted around said dead axle, an internal gear rotatably mounted around said planet carrier, a plurality of planet pinions on said planet carrier meshing with said internal gear and a sun gear on said dead axle meshing with said planet pinions,
  (e) a first ratchet and pawl means between said planet carrier and said driving drum and operatively coupling said planet carrier and said driving drum only during high speed transmission,
  (f) a second ratchet and pawl means between said hub shell and said driving drum for operatively coupling said hub shell and said driving drum only during middle speed transmission,
  (g) a third ratchet and pawl means between the internal gear of said planetary gear mechanism and said driving drum for operatively coupling said internal gear and said driving drum only during low speed transmission,
  (h) a single speed-ratio control means consisting of a plurality of centrifugal governor weights mounted on said driving drum for oscillating movement inwardly and outwardly around said dead axle responsive to the speed of rotation of said driving drum and operatively engaged with said first and second ratchet and pawl means so that during the middle speed transmission said second ratchet gearing operatively couples said hub shell and said driving drum and during the high speed transmission said first ratchet gearing operatively couples said planet carrier and said driving drum,
  (i) means coupled between said planet carrier and said hub shell for transmitting decreased rotation of said planet carrier to said hub shell during the low speed transmission, and
  (j) one-way clutch means between said internal gear and said hub shell for transmitting increased rotation of said internal gear to said hub shell during the high speed transmission.

2. A rear bicycle hub as claimed in claim 1, wherein said third ratchet and pawl means comprises a driven member having internal ratchet-like saw teeth and at least one pawl normally engaged in said saw teeth and oscillatably mounted on said driving drum so as to be brought into operative engagement with said saw teeth during the low speed transmission, said driven member being in splined driving engagement with the internal gear of said planetary gear mechanism for allowing a limited rotation of said driven member relative to said internal gear, and said one-way clutch means comprises a plurality of balls, said internal gear having a plurality of channels therein defining a crown-shaped space between said hub shell and said internal gear, and arcuate projections on said driven member extending into the respective channels and each having an aperture therein in which one of said balls is loosely held in a respective channel, whereby upon limited rotation of said internal gear relative to said driven member each of said balls is forced into a narrower part of said crown-shaped space thereby to be put into frictional engagement with said hub shell only during the high speed transmission.

3. A rear bicycle hub as claimed in claim 1, wherein said first and second ratchet and pawl means comprise first and second internal ratchet-like saw teeth provided respectively on said driving drum and said hub shell, and first and second pawls oscillatably mounted respectively on said planet carrier and said driving drum for independently being operatively engaged with corresponding saw teeth, and further comprising means for changing-over said three stage speed change mechanism from one stage of speed transmission to another irrespective of the speed of rotation of said driving drum, said change-over means including a bushing slidably mounted on said dead axle and actuatable by said centrifugal governor weights to engage and hold said first pawl in operative engagement with said first saw teeth and directly actuatable to hold said second pawl into or out of operative engagement with said second saw teeth, whereby by movement of said bushing said three-stage speed change mechanism can be placed in any one of the three stages of speed transmission.

References Cited
UNITED STATES PATENTS 3,021,728   2/1962   Shimano _____ 74—750
3,366,206   1/1968   Shimano _____ 74—750X
3,432,013   3/1969   Matsumoto _____ 74—750X ARTHUR T. McKEON, Primary Examiner U.S. Cl. X.R.

74—750(Discl.)